Jan. 14, 1964  R. M. A. FERMIER  3,117,461
VARIABLE SPEED DRIVE MECHANISM
Filed July 2, 1962  2 Sheets-Sheet 1
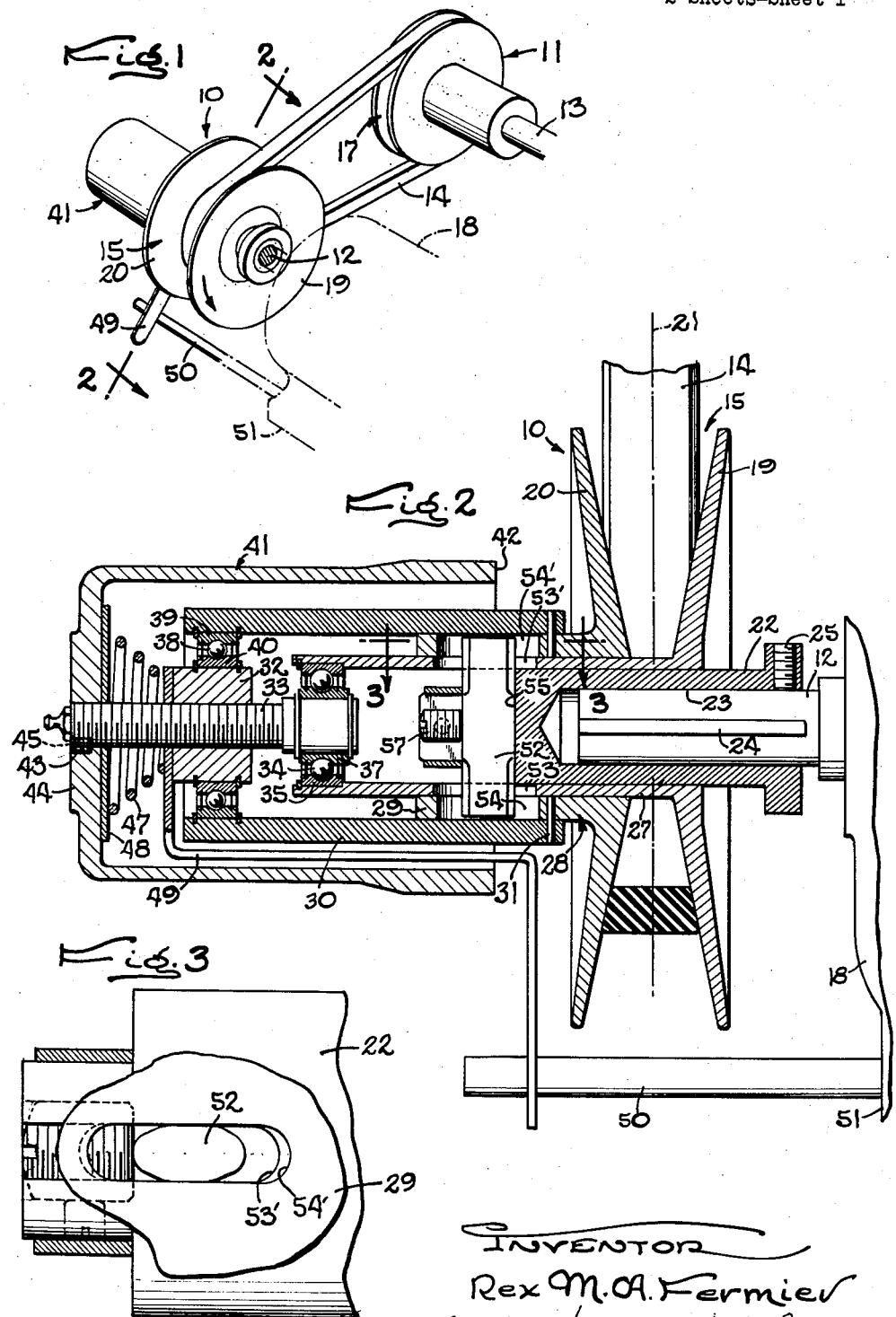
INVENTOR
Rex M. A. Fermier
By Wolfe, Hubbard, Voit & Osann
ATTORNEYS Jan. 14, 1964    R. M. A. FERMIER    3,117,461
VARIABLE SPEED DRIVE MECHANISM
Filed July 2, 1962    2 Sheets-Sheet 2
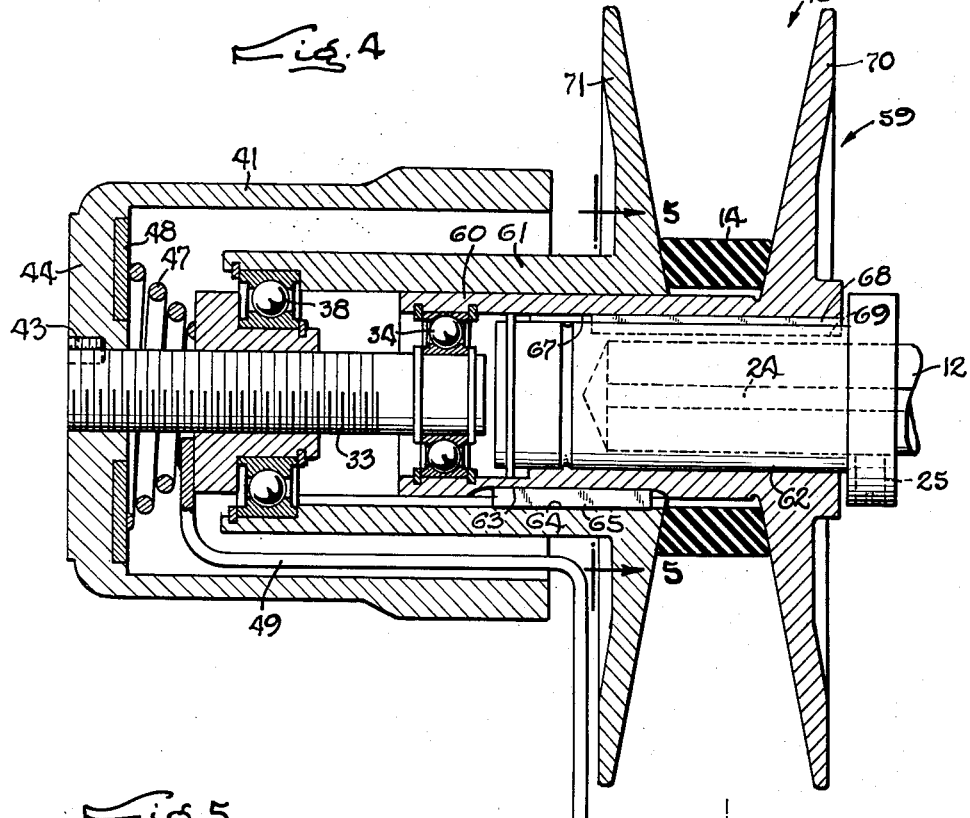
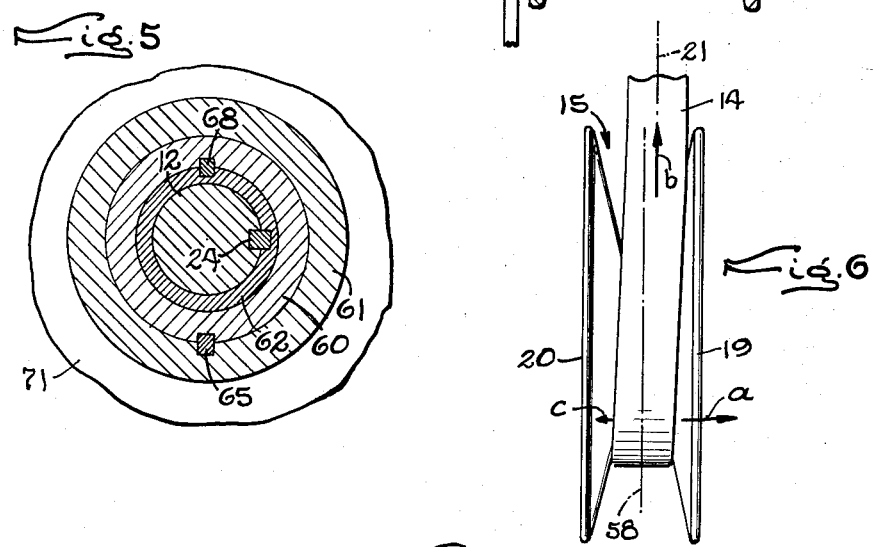
INVENTOR
Rex M.A. Fermier
By Wolfe, Hubbard, ...
ATTORNEYS

United States Patent Office 3,117,461
Patented Jan. 14, 1964

3,117,461
VARIABLE SPEED DRIVE MECHANISM
Rex M. A. Fermier, Chicago, Ill., assignor to Lovejoy Flexible Coupling Co., Chicago, Ill., a corporation of Illinois
Filed July 2, 1962, Ser. No. 206,875
6 Claims. (Cl. 74—230.17)

This invention relates to a variable speed drive mechanism of the type including a fixed pulley and a variable speed pulley mounted on parallel shafts and drivingly connected by a V-belt seated and running in V-grooves in the respective pulleys. In such a drive, the variable speed pulley comprises two cone discs opposing each other and the spacing between them is adjustable to vary the width of the groove and correspondingly change the pitch diameter of the pulley and the speed of the driven device.

The general object of the present invention is to provide in a drive mechanism of the above character a variable speed pulley which, as compared to prior pulleys of this type, is less expensive to produce and facilitates the initial mounting of the pulley on its shaft.

A more specific object is to mount the variable speed pulley for free axial floating on its shaft and utilize the wedging action of the belt on the conical sides of the discs to shift the pulley back and forth along the shaft in response to changes in the width of its groove whereby the variable groove is centered on the groove of the fixed pulley automatically as an incident to changes in the groove width and thereby eliminating the need for centering mechanism in the variable speed pulley.

Other objects and advantages of the invention will become apparent from the following detailed description taken in connection with the accompanying drawings, in which FIGURE 1 is a fragmentary perspective view of a variable speed drive mechanism embodying the novel features of the present invention.

FIG. 2 is an enlarged fragmentary sectional view taken along the line 2—2 of FIG. 1.

FIG. 3 is an enlarged fragmentary sectional view taken along the line 3—3 of FIG. 2.

FIG. 4 is a view similar to FIG. 2 showing an alternate form of the invention.

FIG. 5 is a fragmentary sectional view taken along the line 5—5 of FIG. 4.

FIG. 6 is a fragmentary view diagrammatically illustrating the operation of pulleys constructed in accordance with the present invention.

As shown in the drawings for purposes of illustration, the invention is incorporated in a variable speed drive mechanism (FIG. 1) including two pulleys 10 and 11 mounted on parallel driving and driven shafts 12 and 13 respectively and drivingly connected by a taut, endless V-belt 14 seated and running in V-grooves 15 and 17 in the two pulleys. Herein, the shaft 12 is the output shaft of an electric motor 18 and the shaft 13 is the input shaft of a machine (not shown) to be driven by the motor. To vary the speed at which the machine is driven, one of the pulleys, herein the driving pulley 10, comprises two cone discs 19 and 20 mounted with the conical sides of the discs inclined away from each other and selectively adjuestable along the shaft toward and away from each other thereby to vary the width of the groove 15 and correspondingly change the pitch diameter of the pulley. As the pitch diameter is increased or decreased, the speeds of the belt 14 and the driven pulley 11 are correspondingly increased or decreased. The driven pulley is fast on the shaft 13 with its groove 17 and the belt centered on a predetermined plane 21.

The variable speed pulley 10 includes a central sleeve 22 (FIG. 2) formed with an axial bore 23 for receiving the motor shaft 12, the sleeve being held on the shaft by suitable means such as a key 24 and a set screw 25. Thus, the sleeve constitutes a rigid extension of the motor shaft. The cone disc 19 is formed with a tubular cylindrical hub 27 which telescopes over the sleeve 22 and projects outwardly along the sleeve from the disc. The other disc 20 is mounted on a similar but larger hub 28 which telescopes over the inner hub 27 and extends outwardly from the disc 20 past the open end of the inner hub. Herein, the outer hub is formed by a cylindrical flange 29 (FIG. 2) turned outwardly around the center hole of the disc 20 with a cylindrical sleeve 30 telescoped adjacent one end over the flange 29 and secured thereto by pins 31.

In the present instance, selective adjustment of the spacing of the two discs 19, 20 to vary the pitch diameter of the pulley 10 is accomplished by means of a nut 32 carried in an axially fixed position in the open end of the sleeve 30 and threaded onto a screw 33 axially fixed adjacent one end in the open end of the inner hub 27. As shown in FIG. 2, the inner end portion of the screw is journaled in an anti-friction thrust bearing 34 with its outer race 35 anchored in the open end of the inner hub and its inner race 37 encircling and fast on the screw. The nut 32 is journaled in an anti-friction thrust bearing 38 having an outer race 39 anchored in the sleeve with its inner race 40 encircling and fast on the nut. It will be seen, therefore, that the nut and the screw connect the two hubs and that relative movement of the screw and the nut is transmitted to the hubs through the bearings 34 and 38.

Fast on the outer end of the screw is a cup-like cover 41 which opens toward the pulley and is telescoped over the outer hub 28 with the rim 42 of the cover terminating short of the disc 20. This cover is fastened to the screw 33 by set screw 43 threaded into the cover bottom 44 and received in a notch 45 in the end of the screw. A coiled spring 47 is compressed between the nut and a friction ring 48 encircling the screw and lying against the bottom of the cover, and a torque arm 49 secured at one end to the nut is bent to project out of the cover and then downwardly across an anchor bar 50 on the machine base 51.

With the foregoing arrangement, the torque arm 49 prevents turning of the nut 32 with the pulley 10 and the spring 47 and friction plate 48 exert a frictional drag on the cover to resist creeping rotation of the latter as the pulley turns. To increase the pitch diameter of the pulley, the cover 41 simply is turned in a direction to move the screw 33 and the disc 19 to the left (FIG. 2) relative to the nut 32 thereby decreasing the width of the groove 15 so that the belt 14 rides around the pulley at a larger diameter. Conversely, turning of the cover in the opposite direction shifts the screw to the right thereby increasing the groove width and decreasing the pitch diameter and the speed of the driven machine.

In accordance with the present invention, the variable speed pulley 10 is mounted on the shaft 12 for rotation therewith and also for free axial floating back and forth along the shaft in response to the wedging action of the belt 14 against the conical sides of the discs 19, 20 when the groove 15 is off-center relative to the plane 21 on which the fixed pulley 11 is centered. Accordingly, this action of the belt automatically maintains the variable speed pulley in properly centered relation with the fixed pulley as the width of the groove 15 is varied thereby eliminating the need for precise initial alinement of the pulleys, and also eliminating the need for mechanical means in the variable speed pulley operable to shift the two discs equally in opposite directions as the pitch diameter is adjusted.

While the connections between the hubs 27, 28 and between the pulley 10 and the shaft 12 may take various forms, in the preferred embodiment shown in FIGS. 1 through 3, these connections are formed by a key 52 rotatable with the shaft and projecting radially therefrom on at least one side into two axially elongated and angularly alined overlapping slots 53 and 54 in the respective hubs 27 and 28. The key and the slots coact to lock the hubs and the shaft together for rotation in unison. Moreover, each of the slots is substantially longer than the axial length of the key to accommodate both the movement of the hubs relative to each other as the width of the groove is adjusted and the axial sliding of the inner hub along the shaft to maintain the alinement of the pulleys.

In the present instance, the key 52 is an elongated bar inserted in an axially opening radial notch 55 in the free end of the sleeve 22 with the ends of the bar projecting beyond opposite sides of the sleeve a distance greater than the thickness of the inner hub 27 and less than the combined thicknesses of the hub 27 and the flange 29. A set screw 57 is threaded into the end of the sleeve and tightened against one side of the key to clamp the latter tightly against the inner end of the notch.

Two additional slots 53' and 54' are formed in the hub 27 and the flange 29 respectively on the opposite side of the shaft to receive the opposite end of the key 52. The widths of the slots and the key are correlated so that each slot receives the key with a slight clearance permitting free sliding of the key relative to the hubs. The slots, which preferably are of equal length as shown in FIGS. 2 and 3, are made long enough to accommodate the full range of movement of the hubs relative to each other and the shaft without bringing either hub into abutting engagement with the key. Thus the pulley remains free to float relative to the shaft in all operative positions of the discs.

The action of the belt 14 in centering the pulley 10 during adjustment of the pitch diameter of the latter is illustrated diagrammatically in FIG. 6 in which the amount of displacement of the pulley from the plane 21 is exaggerated for clarity of illustration. As the cover 41 is rotated in a direction to increase the pitch diameter and the screw 33 tends to move the disc 19 toward the left, a condition similar to that shown in FIG. 6 occurs. The center line 58 of the groove 15 tends to shift to the left relative to the fixed pulley and the plane 21, increasing the tension on the belt and causing the latter to bear with greater force on the right disc 19 as indicated in FIG. 6. Accordingly, the force component $a$ exerted by one side of the belt on the conical side of the disc 19 as a result of the tension on the belt, indicated at $b$, is increased and the component $c$ exerted on the disc 20 correspondingly decreases. Because the pulley is mounted to float back and forth on the shaft, this axial force differential shifts the pulley 10 to the right until the force components $a$ and $c$ balance each other, that is, until the groove 15 is centered on the plane 21. It will be seen that any tendency of the pulley to shift in either direction is thus counteracted by the action of the belt. The torque arm 49 slides back and forth along the anchor bar 50 as the pulley shifts back and forth on the shaft.

Illustrated in FIGS. 4 and 5 is a pulley 59 embodying an alternative construction which operates on the same principle as does the preferred construction. In this instance, separate keys and axially elongated keyways are provided to couple the two hubs 60, 61 together and couple the inner hub 60 to the sleeve 62 which, as before, is secured to the motor shaft 12 by the key 24 and the set screw 25.

The keyway between the inner hub 60 and the outer hub flange 61, which may comprise a single piece as shown in FIG. 4 is formed by two angularly alined and axially extending grooves 63 and 64 in the adjacent surfaces of the two hubs. The key 65 is seated in the shorter inner groove 63 and is slidable along the outer groove 64 which is long enough to accommodate the full range of relative movement of the hubs. Herein, the groove 64 extends completely through the hub flange.

Similarly, the keyway between the inner hub 60 and the sleeve 62 includes an elongated axial groove 67 formed in the inner hub and sufficiently longer than the key 68 to accommodate the full range of sliding of the inner hub on the sleeve, the key being seated in a shorter angularly alined groove 69 in the outer periphery of the sleeve 62. While the two keys 65 and 68 are disposed herein on diametrically opposite sides of the shaft, it will be apparent that their angular spacing is immaterial.

The operation of the modified pulley is the same as the operation of the preferred pulley. During adjustment of the positions of the discs 70 and 71, the inner hub 60 slides relative to the outer hub 61 in one direction or the other as permitted by the length of the groove 67. Simultaneously, the action of the belt on one of the cone discs slides the inner hub along the sleeve 62 in a direction to maintain the V-groove in properly centered relation as permitted by the length of the groove 64. The keys 65 and 68, of course, couple the hubs together and to the sleeve for rotation in unison with the shaft.

With either of the foregoing arrangements, the assembled pulley may be mounted on the shaft 12 simply by telescoping the sleeve onto the shaft and tightening the set screw 25 to lock the sleeve in place when the V-groove 15 is in approximate alinement with the V-groove 17 of the fixed pulley 11. When the motor 18 is started, the force of the belt 14 on the appropriate one of the discs centers the pulley on the plane 21 automatically and thereby eliminates the need for precise initial alinement of the pulleys. Further, any adjustments in the pitch diameter of the pulley result in automatic adjustment of the position of the pulley along the shaft 12 to maintain the centering without mechanism for mechanically shifting the two discs equal distances in opposite directions. It will be evident, therefore, that both the manufacture and the initial assembly of the pulley are simplified in pulleys of the type described above.

I claim as my invention:

1. In a variable speed drive mechanism including an endless V-belt centered on a predetermined plane, the combination of, a shaft mounted to rotate about an axis normal to said plane, a first cone disc disposed on one side of said plane and having a hub telescoping with said shaft, a second cone disc disposed on the opposite side of said plane and having a hub telescoped onto the hub of said first disc, the conical sides of said discs being inclined away from each other and forming a variable speed pulley having a V-groove for receiving said belt and drivingly connecting said pulley to the belt, a key fast on said shaft for rotation therewith and projecting radially from the shaft on opposite sides thereof, said hubs being formed with two sets of axially elongated overlapping slots disposed on said opposite sides to receive the projecting end portions of said key and each slot being substantially longer than the axial length of said end portions whereby the latter couple the hubs together and to the shaft for rotation in unison while permitting axial adjustment of the hubs relative to each other and free axial sliding of the hubs along the shaft, and means connecting said discs together in a predetermined axially spaced relation and selectively operable to vary the axial spacing of the discs thereby to vary the width of said groove and the pitch diameter of said pulley, said pulley being slidable back and forth along said shaft in response to the wedging force of said belt on said discs thereby to maintain the centering of said groove on said plane as the width of the groove is varied.

2. In a variable speed drive mechanism including an endless V-belt centered on a predetermined plane, the combination of, a shaft mounted to rotate about an axis normal to said plane, a first cone disc disposed on one side of said plane and having a hub telescoping with said shaft, a second cone disc disposed on the opposite side of said plane and having a hub telescoped onto the hub of said first disc, the conical sides of said discs being inclined away from each other and forming a variable speed pulley having a V-groove for receiving said belt and drivingly connecting said pulley to the belt, a key fast on said shaft for rotation therewith and projecting radially from the shaft on one side thereof, said hubs being formed with axially elongated and angularly alined overlapping slots each substantially longer than the axial length of the projecting end portion of said key and disposed on said one side to receive said end portion whereby the latter couples the hubs together and to the shaft for rotation in unison while permitting axial adjustment of the hubs relative to each other and free axial sliding of the hubs along the shaft, and means connecting said discs together in a predetermined axially spaced relation and selectively operable to vary the axial spacing of the discs thereby to vary the width of said groove and the pitch diameter of said pulley, said pulley being slidable back and forth along said shaft in response to the wedging force of said belt on said discs thereby to maintain the centering of said groove on said plane as the width of the groove is varied.

3. In a variable speed drive mechanism including an endless V-belt centered on a predetermined plane, the combination of, a shaft mounted to rotate about an axis normal to said plane, a first cone disc disposed on one side of said plane and having a hub telescoping with said shaft, a second cone disc disposed on the opposite side of said plane and having a hub telescoped onto the hub of said first disc, the conical sides of said discs being inclined away from each other and forming a variable speed pulley having a V-groove for receiving said belt and drivingly connecting said pulley to the belt, a key rotatable with said shaft and projecting radially from the shaft on one side thereof, said hubs being formed with axially elongated and angularly alined overlapping slots each substantially longer than the axial length of said key and disposed on said one side to receive the projecting end portion of the key whereby the latter couples the hubs together and to the shaft for rotation in unison while permitting axial adjustment of the hubs relative to each other and free axial sliding of the hubs along the shaft, and means connecting said discs together in a predetermined axially spaced relation and selectively operable to vary the axial spacing of the discs thereby to vary the width of said groove and the pitch diameter of said pulley, said pulley being slidable back and forth along said shaft in response to the wedging force of said belt on said discs thereby to maintain the centering of said groove on said plane as the width of the groove is varied.

4. In a variable speed drive mechanism including an endless V-belt centered on a predetermined plane, the combination of, a shaft mounted to rotate about an axis normal to said plane, a first cone disc disposed on one side of said plane and having a first hub telescoped onto said shaft for free axial sliding thereon, a second cone disc disposed on the other side of said plane and having a hub telescoping with and axially slidable on the hub of said first disc, said discs cooperating to form a pulley having a V-groove, means for securing said hubs in a predetermined axial relation and for selectively varying the axial spacing of said discs relative to each other thereby to vary the width of said groove and the pitch diameter of said pulley, and means keying said hubs together and to the shaft for conjoint rotation and for free axial floating of the entire pulley back and forth along the shaft in response to the wedging force of said belt on said discs thereby to maintain the centering of said groove on said plane as the width of the groove is varied.

5. A variable speed drive mechanism as defined in claim 4 in which said keying means comprise a first axially extending keyway formed between said hubs, a first key substantially shorter than said keyway seated in the latter to couple said hubs together for rotation in unison while permitting axial adjustment of the hubs relative to each other, a second axially extending keyway formed between said shaft and the hub of said first disc, and a second key substantially shorter than said second keyway seated in the latter to couple said pulley to the shaft for rotation therewith while permitting free axial sliding of the pulley along the shaft.

6. In a variable speed drive mechanism including an endless V-belt centered on a predetermined plane, the combination of, a shaft mounted to rotate about an axis normal to said plane, first and second cone discs having center bores coaxial with and telescoped onto said shaft, said discs being disposed on opposite sides of said plane and cooperating to form a variable speed pulley having a V-groove for receiving said belt and drivingly connecting the pulley to the belt, means for securing said discs together in a predetermined axially spaced relation and selectively operable to vary the axial spacing of the discs relative to each other thereby to vary the width of said groove and the pitch diameter of said pulley, and means keying said discs to said shaft for conjoint rotation and for free axial floating of the entire pulley back and forth along the shaft in response to the wedging force of said belt on said discs thereby to maintain the centering of said groove on said plane as the width of the groove is varied.

References Cited in the file of this patent

UNITED STATES PATENTS

| | | |
|---|---|---|
| 2,611,277 | Mitchell | Sept. 23, 1952 |
| 2,751,790 | Ingold | June 26, 1956 |